United States Patent [19]

Tsuru et al.

[11] Patent Number: 5,703,658
[45] Date of Patent: Dec. 30, 1997

US005703658A

[54] VIDEO DECODER/CONVERTER WITH A PROGRAMMABLE LOGIC DEVICE WHICH IS PROGRAMMED BASED ON THE ENCODING FORMAT

[75] Inventors: Yasutaka Tsuru; Takumi Okamura, both of Yokohama; Shoji Kimura, Kawasaki; Yuji Yamamoto, Yokohama; Toshinori Murata, Yokohama; Kenji Katsumata, Yokohama; Moriyoshi Akiyama, Fujisawa; Takanori Eda, Yokohama, all of Japan

[73] Assignee: Hitachi, Ltd., Tokyo, Japan

[21] Appl. No.: 661,990

[22] Filed: Jun. 12, 1996

[30] Foreign Application Priority Data

Jun. 14, 1995 [JP] Japan ................................. 7-147011

[51] Int. Cl.[6] .................................................. H04N 71/01
[52] U.S. Cl. ........................ 348/554; 348/441; 348/555; 341/78; 341/88
[58] Field of Search ...................... 345/154; 364/713.03; 386/131, 1, 33, 37, 40, 109, 112, 123, 124; 326/37, 39; 341/50, 78, 88; 348/554, 555, 556, 558, 441, 442, 443, 445, 446, 447, 448, 458, 459; 340/825.83; H04N 7/01

[56] References Cited

U.S. PATENT DOCUMENTS 4,797,746  1/1989  Ashcraft ................................. 348/441

Primary Examiner—John A. Peng
Assistant Examiner—Nathan J. Flynn
Attorney, Agent, or Firm—Antonelli, Terry, Stout & Kraus, LLP

[57] ABSTRACT

An apparatus and a method for receiving television signals can display a television signal of a novel signal format, even at a low cost, without addition of any hardware. The apparatus and a method for receiving a television signal employs a data input unit for receiving video data encoded by any one format among multiple kinds of encoding formats, a video data memory for storing the video data from the data input unit, a decoding process program memory for storing multiple kinds of decoding process programs for decoding processes corresponding to received video data having multiple kinds of encoding formats, a programmable logic device which can vary the hardware constitution for the decoding process, a logic device varying unit for varying the hardware constitution for the decoding process, a decoding control unit for varying the circuit constitution of the programmable logic device via the logic device varying unit depending on the encoding format of the input video data and decoding the video data stored in the video data memory into a video signal which may be displayed depending on the decoding process program, and a display for displaying the decoded video signal.

3 Claims, 4 Drawing Sheets

VIDEO DECODER/CONVERTER WITH A PROGRAMMABLE LOGIC DEVICE WHICH IS PROGRAMMED BASED ON THE ENCODING FORMAT

BACKGROUND OF THE INVENTION AND RELATED ART STATEMENT

The present invention relates to an apparatus and a method for receiving television signals, and particularly to an apparatus and a method for receiving television signals, such as digital television signals.

In general, a video signal is encoded to a specified signal format at the time the signal is broadcasted or recorded in an accumulation medium. Such a signal format can be classified into various formats, including NTSC (National Television System Committee), PAL (Phase Alternation by Line), SECAM (Sequentical Couleur A M'emoire), MUSE (Multiple Sub-Nyquist-Sampling Encoding), MPEG1 (Moving Picture Coding Experts Group-1) and MPEG2 (Moving Picture Coding Experts Group-2).

A television signal receiving apparatus of the related art is equipped with a decoding circuit which is responsive to respective signal formats in order to decode a broadcast video signal or a recorded video signal of an accumulation medium and then to display such a video signal.

In a television signal receiving apparatus provided with a decoding circuit, external video data is supplied to a data input circuit via a data input terminal. This data input circuit converts the supplied video data into a bit stream signal, supplies this bit stream signal to a video data memory and then stores the video data in the video data memory.

The video data stored in the video data memory is decoded by an exclusive hardware circuit which performs only a specified decoding process to create a converted video signal which can be displayed, and thereafter the converted video signal is supplied to a video display device. As a result, the video signal can be displayed on the video display device.

However, in the case where a broadcasting station transmits a signal having a new type signal format (hereinafter referred to as the signal format B), in addition to an existing signal format (hereinafter referred to as the signal format A), the existing television signal receiving apparatus, which is provided only with an exclusive decoding circuit for the signal format A cannot receive and display a signal having the new type signal format B.

For this reason, there arises a problem here that a television viewer is obliged to install a new television signal receiving apparatus equipped with a decoding circuit for the signal format B in order to receive a broadcast using the signal format B in addition to a broadcast using the signal format A.

Moreover, for the decoding of television signals of a plurality of signal formats with a unit of a television signal receiving apparatus, it is required to provide a plurality of decoding circuits suitable for a plurality of signal formats, inevitably resulting in considerable increase in the price of the apparatus.

SUMMARY OF THE INVENTION

It is therefore an object of the present invention to provide an apparatus and a method for receiving television signals, which can be produced at a low cost without the addition of any hardware circuit to display television signals using new type signal formats.

For purposes of achieving the object mentioned above and according to one aspect of the present invention, there is provided a television signal receiving apparatus comprising a data input means for obtaining video data encoded in any one format desired among multiple kinds of encoding formats; a video data memory means for storing the video data from the data input means; a decoding process program memory means for storing multiple kinds of decoding process programs for executing decoding processes corresponding to the video data of the multiple kinds of encoding formats; a programmable logic device which can vary the hardware constitution for executing the decoding processes; a logic device varying means for varying the circuit constitution of the programmable logic device; a decoding control means for varying the circuit constitution of the programmable logic device via the logic device varying means depending on the encoding format of the input video data and for decoding, depending on the decoding process programs mentioned above, the video data stored in the video data memory means into a video signal which can be displayed; and a display means for displaying the decoded video signal.

In the television signal receiving apparatus described above, the decoding control means is preferably provided with an encoding format detector means for detecting the encoding format of the input video data, a program selector means for reading from the decoding process program memory means the decoding process program for decoding the signal of the encoding format detected by the encoding format detector means, and a decoding processor means for varying the circuit constitution of the programmable logic device via the logic device varying means depending on the program read out by the program selector means and for decoding the video data stored in the video data memory means into a video signal which may be displayed.

Moreover, the television signal receiving apparatus is preferably provided with a program managing means for storing the decoding format of the decoding process program stored in the decoding process program memory means, a program comparing means for comparing the decoding format of the decoding process program inputted from the data input means with the decoding format stored in the program managing means, and a program updating means for storing the decoding process program inputted from the data input means into the decoding process program memory means in such a case that the decoding process program inputted from the data input means is judged, by the program comparing means, to be stored in the program comparing means.

For purposes of achieving the object described above and according to another aspect of the present invention, there is provided a television signal receiving method comprising the steps of inputting video data which is encoded by any one format of multiple kinds of encoding formats; storing the inputted video data; executing a decoding process program corresponding to the encoding format of the stored video data among multiple kinds of decoding process programs corresponding to the video data of the multiple kinds of encoding formats; varying the hardware constitution of a programmable logic device corresponding to the encoding format of the stored video data through the above-mentioned execution; decoding the stored video data into a video signal via the varied hardware constitution of the programmable logic device; and thereafter displaying the decoded video signal on a display device.

Moreover, in the television signal receiving method described above, the video data is preferably a television receiving signal received via an antenna, a television receiving signal received via a telephone line or a television receiving signal received via package media.

Here, the operation of this invention will be explained. The video data is inputted through the data input means and is then stored in the video data memory means. The decoding control means outputs a varying instruction to the logic device varying means, causing the programmable logic device to vary its circuit constitution for decoding the input video data. Next, the decoding control means reads out the decoding process program for decoding the input video data from the decoding process program memory means. The decoding control means operates the programmable logic device depending on the processing program obtained by the readout operation to properly decode the video data. The decoded video data is stored in the video data memory means and is then displayed on the display means.

With introduction of the features described above, it is possible to implement a television signal receiving apparatus which can receive signals of new decoding formats without provision of an appended hardware circuit in the television signal receiving apparatus, by executing a selected one of multiple kinds of decoding process programs stored in the decoding process program memory means.

DETAILED DESCRIPTION OF THE PREFERRED EMBODIMENTS

Figure 1:
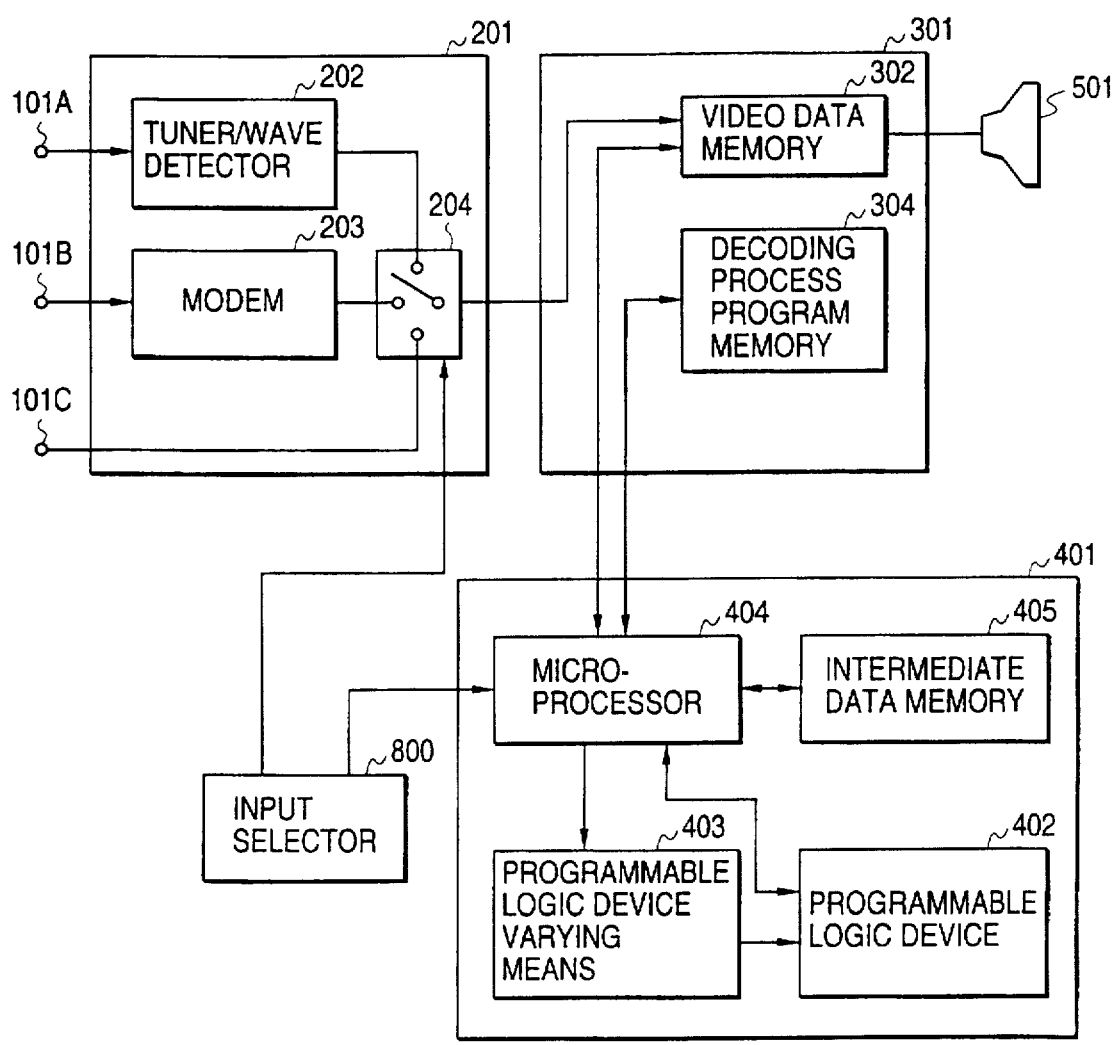
FIG. 1 is a schematic block diagram of a first embodiment of the present invention.

Preferred embodiments of the present invention will be explained hereunder. FIG. 1 is a schematic block diagram of a television signal receiving apparatus forming a first embodiment of the present invention. In FIG. 1, signal input terminals 101A, 101B, 101C are television signal input terminals. The input terminal 101A is the input terminal of a television signal received via an antenna; the input terminal 101B is the input terminal of a television signal received via a telephone line; and the input terminal 101C is the input terminal of a television signal received from package media, such as a video tape device and a laser disc device.

The television signal inputted from the input terminal 101A is converted into a bit stream signal by a tuner and detector circuit 202 of a data input means 201 and is then supplied to a first input terminal of a selector circuit 204. Meanwhile, the television signal inputted from the input terminal 101B is converted into a bit stream signal by a modem circuit 203 and is then supplied to a second input terminal of the selector circuit 204. Moreover, the television signal inputted from the input terminal 101C is supplied to a third input terminal of the selector circuit 204.

An input selector means 800 is a selecting means for selecting, by operation of a television viewer, a signal from the television signals inputted from the input terminals 101A, 101B and 101C and is also a means for identifying an input television signal format to a microprocessor 404 to be described later. Depending on the selection signal from the input selector means 800, the selector circuit 204 selects the data received through one of the first, second and third input terminals.

The television signal from the output of the selector circuit 204 is stored in a video data memory 302 of a data memory means 301. This data memory means 301 is also provided, in addition to the video data memory 302 described above, with a decoding process program memory 304 for storing decoding process programs for each television signal format.

The microprocessor 404 of a decoding control means 401 reads the decoding process program of the television signal to be decoded from the decoding process program memory 304, depending on the selection signal received from the input selector means 800. The microprocessor 404 supplies an instruction signal to a programmable logic device varying means 403 to vary the internal circuit constitution of a programmable logic device 402 to the constitution required for a decoding process suitable for processing the readout decoding program. The programmable logic device varying means 403 varies the internal circuit configuration of the programmable logic device 402 in accordance with the supplied instruction signal.

Next, the microprocessor 404 reads video data stored in the video data memory 302 and executes the decoding of the video data by controlling operations of the programmable logic device 402. In this case, the microprocessor 404 executes the decoding process, while storing and reading intermediate data into and from an intermediate data memory 405.

Upon completion of the decoding process of the video data, the microprocessor 404 supplies such video data to a display device 501 through the video data memory 302. This display device 501 displays the video signal.

Figure 2:
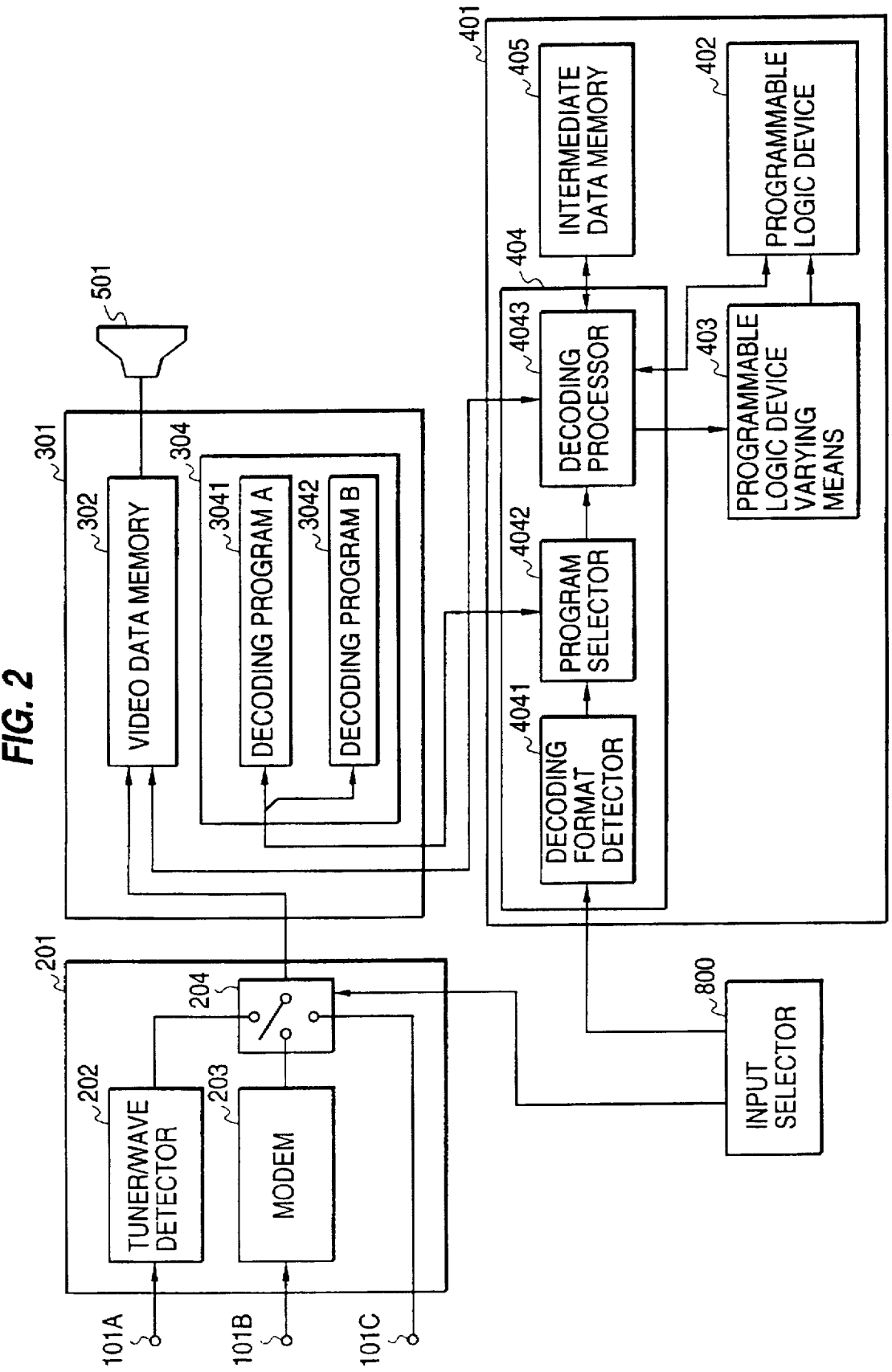
FIG. 2 is a functional block diagram showing further details of a microprocessor used in the embodiment of FIG. 1.

FIG. 2 shows details of the microprocessor 404 provided in FIG. 1, as explained previously. In FIG. 2, the microprocessor 404 comprises a decoding format detector means 4041, a program selector means 4042 and a decoding processor means 4043.

The decoding format detector means 4041 detects the decoding format specified by the instruction signal received from the input selector means 800 and supplies a signal specifying the decoding format to the program selector means 4042. The program selector means 4042 then selects the decoding format program specified by the signal supplied from the decoding format detector means 4041 from decoding programs A and B stored in the memory areas 3041 and 3042 of the decoding process program memory 304 and reads it out to the decoding processor means 4043.

The decoding processor means 4043 qualifies the circuit constitution of the programmable logic device 402 through the programmable logic device varying means 403, depending on the supplied decoding program. The decoding processor means 4043 reads video data from the video data memory 302 and executes the decoding process of the video data utilizing the programmable logic device 402 and the intermediate data memory 405. The decoded video data is displayed, as explained previously, on the display device 501 by way of the video data memory 302.

As described, in the first embodiment of the present invention, the circuit constitution of the programmable logic device 402 is varied depending on the decoding program selected from the decoding process program memory 304 and the microprocessor 404 decodes the video data utilizing the varied programmable logic device 402.

Therefore, there is provided a low cost television signal receiving apparatus which can accept a television signal having a novel signal format without any addition of hardware.

Figure 3:
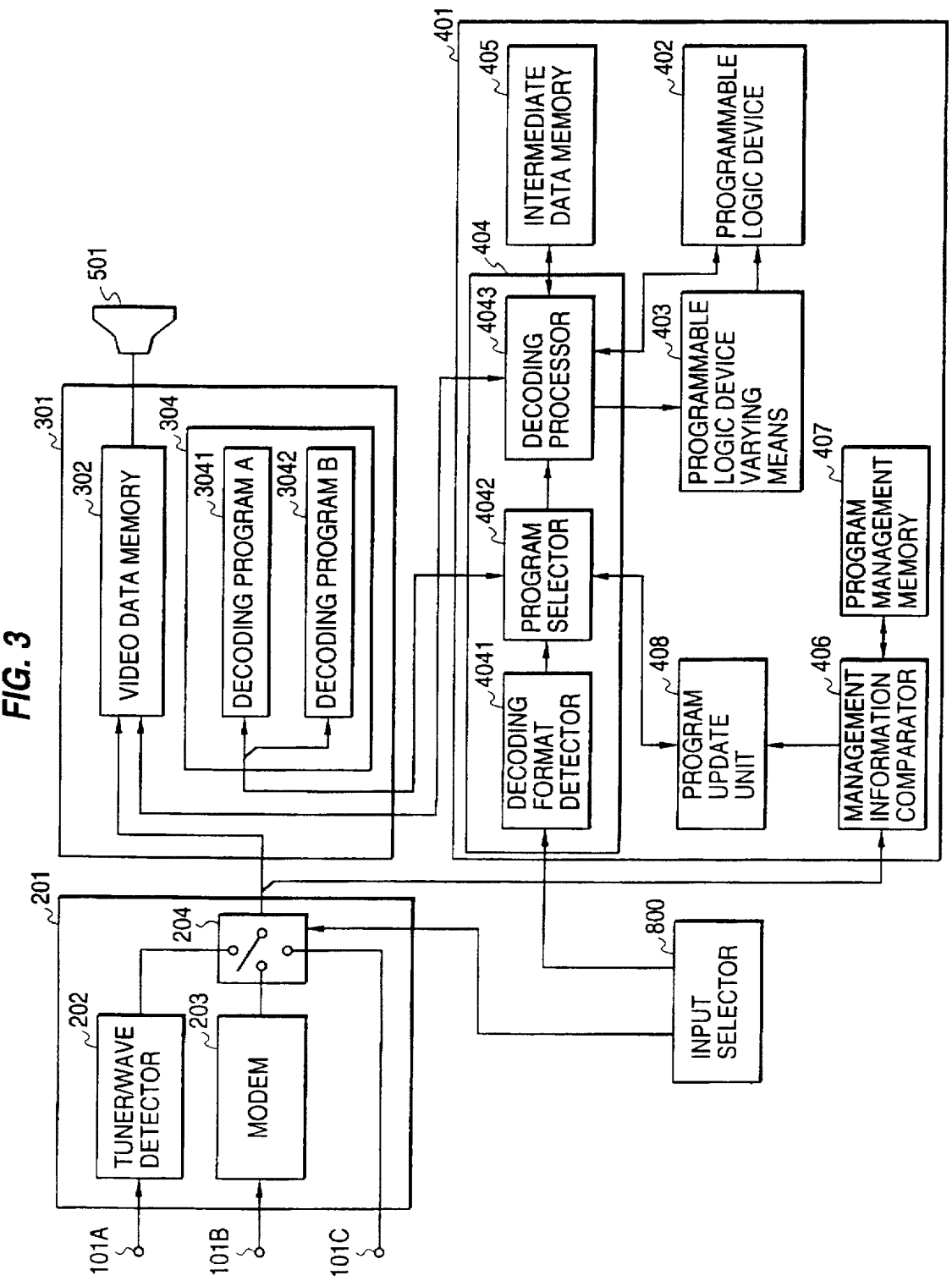
FIG. 3 is a schematic block diagram of a second embodiment of the present invention.

FIG. 3 is a block diagram of a second embodiment of the present invention. The elements corresponding to those of FIG. 1 and FIG. 2 are designated by the same reference numerals. The difference of FIG. 3 from FIG. 1 and FIG. 2 is only that the decoding control means 401 additionally has a management information comparing means 406, a program management memory 407 and a program update means 408.

The program management memory 407 is provided for managing information, such as a program identification code and version information relating to the decoding process programs stored in the decoding process program memory 304. Meanwhile, the management information comparing means 406 compares transmission program management information supplied, for example, from the input terminal 101C of the data input means 201 via the selector circuit 204 with the program management information stored in the program management memory 407.

The program update means 408 updates the decoding process program memory 304 by adding a new decoding process program to the decoding process program memory 304 and by upgrading the version of the decoding process programs already stored in the decoding process program memory 304, via the program selector means 4042 depending on the comparison result produced by the management information comparing means 406.

In short, the management information comparing means 406 judges, when the decoding process program is inputted from the data input means 201, whether or not such program is already stored in the program memory 304 and, if it is not yet stored, adds such program to the program memory 304.

As described, the second embodiment of the present invention provides the following effect, in addition to an effect similar to that of the first embodiment of the present invention. Namely, there is provided a television signal receiving apparatus which can automatically add to and update the decoding process programs stored in the program memory 304 to facilitate a change of the signal format of a television signal and the addition of a new format of a television signal.

In a modification of the embodiment shown in FIG. 3, the program update means 408 calculates and stores the application frequency of a plurality Of program storing areas of the program memory 304. For addition of new programs to the program memory 304, the new program is stored in a storing area of the program memory which is not used or has the lowest access frequency.

With the constitution described above, the storing area of the program memory 304 can be used effectively, enabling reduction of the storing capacity of the program memory 304.

Figure 4:
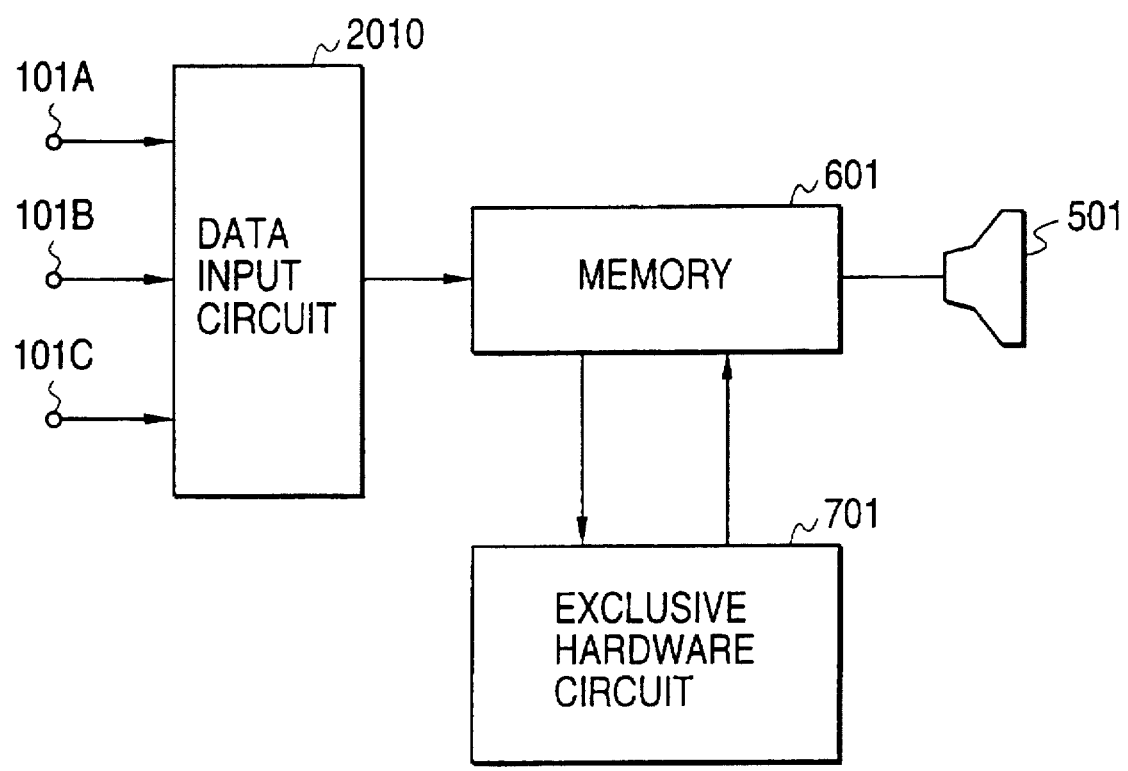
FIG. 4 is a schematic block diagram of a receiving apparatus different from that of the present invention presented for comparison with the present invention.

FIG. 4 is a schematic block diagram of a television signal receiving apparatus which can decode only a television signal of a single signal format. This figure is provided for comparison with the constitution of the present invention.

In FIG. 4, external video data is supplied to the data input means 2010 via the data input terminal 101A, 101B or 101C. This data input means 2010 converts the supplied video data into a bit stream signal and then supplies it to the video data memory 601, causing the video data memory 601 to store it.

The video data stored in the video data memory 601 is decoded by an exclusive hardware circuit 701 which executes only a particular decoding process and thereby converts the data into a video signal which can be displayed. Thereafter, the resultant video signal is supplied to the display device 501 via the memory 601. The video signal is displayed on the display device 501.

In the case of the example of FIG. 4, it is impossible to decode a television signal of another signal format different from the signal format which can be decoded by the existing exclusive hardware circuit 701. Therefore, when it is required to decode the television signal of any other signal format, an exclusive hardware circuit which can decode the television signal of such signal format must be added.

Moreover, another exclusive hardware circuit must be added each time when it is required to decode television signals of other signal formats, not only resulting in enlargement of the circuit constitution, but also providing probability for use of unnecessary exclusive hardware circuits.

In contrast, in accordance with the present invention as described previously, a plurality of decoding process programs are stored in advance in the program memory 304 and the programmable logic device 402 is varied to execute a necessary program, depending on a program to be processed. Therefore, addition of a new exclusive hardware circuit is no longer necessary as in the case of the example of FIG. 4.

In the embodiment of FIG. 3, addition and update of a decoding program can be performed, for example, for all decoding process programs when the power switch is turned ON or for only the decoding process program required for reception of a program each time such program is changed.

Further, the data memory means 301 used in the above embodiments may be constituted by a memory device selected freely, such as a general purpose RAM, a special application memory like a frame memory, a ROM and an auxiliary memory like a hard disc.

In addition, it is also possible to constitute a part or the entire part of the data memory means 301 with a memory which can hold internal data even after the power switch of the television receiving apparatus is turned OFF, such as a nonvolatile memory or a memory having the backup power supply.

When such constitution is first set up, it is no longer required, upon taking a decoding process program, to fetch such decoding process program again even when the power switch of the television signal receiving apparatus is turned ON again.

In the above embodiments, only two data storing areas 3041 and 3042 are illustrated for the decoding process program memory 304, but three or more data storing areas can also be used.

Moreover, the signal format of an external television signal is inputted by a user from the input selector means 800 in the above examples, but it is also possible that the signal format is automatically judged by the microprocessor means 404 from the supplied video data.

The present invention has been constituted as explained above and therefore it provides the following effects.

The television signal receiving apparatus comprises memory means for storing the video data from the input means, memory means for storing a plurality of decoding process programs, a programmable logic device, a logic device varying means for varying the circuit constitution of the programmable logic device, a decoding control means for varying the circuit constitution of the programmable logic device via the logic device varying means and for decoding, depending on the stored decoding process program, the video data stored in the video data memory into the video signal which can be displayed, and a display means for displaying the decoded video signal. Therefore, the present invention provides a low cost television signal receiving apparatus which can display television signals of new signal formats without the addition of any hardware circuit.

Furthermore, a television signal receiving apparatus which can automatically add to and update the decoding process programs stored in the decoding process program memory and also can facilitate a change of the signal format of a television signal and the addition of a television signal of a new signal format can be implemented, by additionally providing the program management means for storing the decoding format of the program stored in the decoding process program memory, the program comparing means for comparing the decoding format of the program from the data input means with the decoding format stored in the program management means, and the program update means for storing the decoding process program from the data input means into the decoding process program memory, based on the comparison result of the program comparing means.

We claimed:

1. A television signal receiving apparatus, comprising:

data input means for fetching input video data encoded by any one encoding format from among multiple kinds of encoding formats;

video data memory means for storing the input video data received from said data input means;

decoding process program memory means for storing multiple kinds of decoding process programs to execute decoding processes corresponding respectively to video data having respective ones of said multiple kinds of encoding formats;

a programmable logic device capable of having at least a part of a circuit construction thereof varied to execute the decoding process;

logic device varying means for varying the circuit construction of said programmable logic device;

decoding control means for controlling said logic device varying means to vary the circuit construction of the programmable logic device depending on the encoding format of the input video data and for decoding the input video data stored in said video data memory means into a decoded video signal which may be displayed, depending on a selected decoding process program; and display means for displaying said decoded video signal.

2. A television signal receiving apparatus as set forth in claim 1, wherein said decoding control means includes:

encoding format detector means for detecting the encoding format of the input video data;

program selector means for reading, from said decoding process program memory means, a decoding process program for decoding a signal having the encoding format detected by said encoding format detector means; and decoding processor means for varying the circuit constitution of the programmable logic device via the logic device varying means depending on the program read-out by the program selector means.

3. A television signal receiving apparatus as set forth in claim 2, further comprising:

program management means for storing a decoding format of a decoding process program stored in the decoding process program memory means;

program comparing means for comparing the decoding format of a decoding process program inputted from the data input means with a decoding format stored in said program management means; and program update means for storing, when said program comparing means judges that a decoding process program inputted from the data input means is already stored in the decoding process program memory means, said decoding process program inputted from the data input means into the decoding process program memory means.

* * * * *